(12) United States Patent
Goldberg et al.

(10) Patent No.: US 9,869,542 B2
(45) Date of Patent: Jan. 16, 2018

(54) SYSTEM AND METHOD FOR RESAMPLING OPTICAL COHERENCE TOMOGRAPHY SIGNALS IN SEGMENTS

(71) Applicant: Axsun Technologies LLC, Billerica, MA (US)

(72) Inventors: Brian Goldberg, Cambridge, MA (US); Bartley C. Johnson, North Andover, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 14/257,568

(22) Filed: Apr. 21, 2014

(65) Prior Publication Data
US 2015/0300806 A1  Oct. 22, 2015

(51) Int. Cl.
G01B 9/02 (2006.01)

(52) U.S. Cl.
CPC ..... G01B 9/02083 (2013.01); G01B 9/02004 (2013.01); G01B 9/02069 (2013.01); G01B 9/02091 (2013.01)

(58) Field of Classification Search
CPC ............ G01B 9/02004; G01B 9/02083; G01B 9/02084; G01B 9/02091
(Continued)

(56) References Cited

U.S. PATENT DOCUMENTS 6,980,299 B1 * 12/2005 de Boer ............. G01B 9/02083
356/497
7,415,049 B2   8/2008 Flanders et al.
(Continued)

FOREIGN PATENT DOCUMENTS

| DE | 202012002375 U1 | 6/2012 |
|---|---|---|
| WO | 2012151547 A2 | 11/2012 |
| WO | 2012151574 A2 | 11/2012 |

OTHER PUBLICATIONS

Desjardins, Adrien E, et al., "Real-time FPGA Processing for High-Speed Optical Frequency Domain Imaging," IEEE Trans Med Imaging, vol. 28, No. 9, pp. 1468-1472, Sep. 2009.

Hsu, K., et al., "Miniature, Fast Wavelength-Swept Sources Based on External Grating Cavity with Resonant MEMS Mirror," Conference on Lasers and Electro-Optics 2013, San Jose, CA, Jun. 10, 2013.

(Continued)

*Primary Examiner* — Dominic J Bologna
(74) *Attorney, Agent, or Firm* — HoustonHogle LLP

(57) ABSTRACT

A system and method for resampling interference datasets of samples in segments, in a swept-source based Optical Coherence Tomography (OCT) system. The resampling is preferably performed within a Field Programmable Gate Array (FPGA) of the OCT system, the FPGA preferably having Fourier-transform based signal processing capabilities such as Fast Fourier Transform (FFT) cores. Resampling the interference datasets in segments provides a flexible approach to resampling that makes efficient use of system resources such as FFT cores. By resampling the interference datasets in segments, the system adjusts to an increased number of resampling points as the imaging depth upon the sample increases. The OCT system then combines the segments using overlapping values of the resampling points between adjacent resampling regions of the resampled segments, and performs Fourier Transform based post-processing on the combined segments to obtain axial profiles of the sample at desired imaging depths.

22 Claims, 11 Drawing Sheets

(58) Field of Classification Search
USPC .............. 356/479, 497, 511; 702/155, 189
See application file for complete search history.

(56) References Cited

U.S. PATENT DOCUMENTS

| | | | | |
|---|---|---|---|---|
| 7,463,362 | B2* | 12/2008 | Lasker et al. | 356/497 |
| 8,358,819 | B2 | 1/2013 | Wu et al. | |
| 8,401,257 | B2 | 3/2013 | Izatt et al. | |
| 8,526,472 | B2 | 9/2013 | Flanders et al. | |
| 8,564,783 | B2 | 10/2013 | Flanders et al. | |
| 8,582,109 | B1* | 11/2013 | Schmitt | 356/479 |
| 2008/0117430 | A1* | 5/2008 | Terakawa et al. | 356/511 |
| 2008/0205717 | A1 | 8/2008 | Reeves et al. | |
| 2011/0255095 | A1 | 10/2011 | Jiang et al. | |
| 2013/0003077 | A1 | 1/2013 | Suehira et al. | |
| 2013/0301000 | A1 | 11/2013 | Sharma et al. | |
| 2014/0063506 | A1* | 3/2014 | Kang et al. | 356/451 |
| 2014/0207418 | A1* | 7/2014 | Vemishetty | G01B 9/02004 702/191 |

OTHER PUBLICATIONS

Li, Jian, et al., "Scalable, High Performance Fourier Domain Optical Coherence Tomography: why FPGAs and not GPGPUs," 2011 IEEE 19th Annual Internatioanl Symposium on Field-Programmable Custom Computing machines (FCCM), May 1-3, 2011, Salt Lake City, UT, pp. 48-56.

Smith, Julius O., III, "The Digital Audio Resampling Home Page," Center for Computer Research in Music and Acoustics (CCRMA), Stanford University, <https://ccrma.stanford.edu/~jos/resample/>, accessed Mar. 2011.

Li, Jian et al. "Scalable, High Performance Fourier Domain Optical Coherence Tomography: why FPGAs and not GPGPUs." 2011 IEEE 19th Annual International Symposium on Field-Programmable Custom Computing Machines, May 1, 2011, pp. 49-56.

International Search Report and Written Opinion of the International Searching Authority, dated Jun. 29, 2015, from counterpart International Application No. PCT/US2015/026394, filed Apr. 17, 2015.

International Preliminary Report on Patentability, dated Nov. 3, 2016, from International Application No. PCT/US2015/026394, filed Apr. 17, 2015. Seven pages.

* cited by examiner

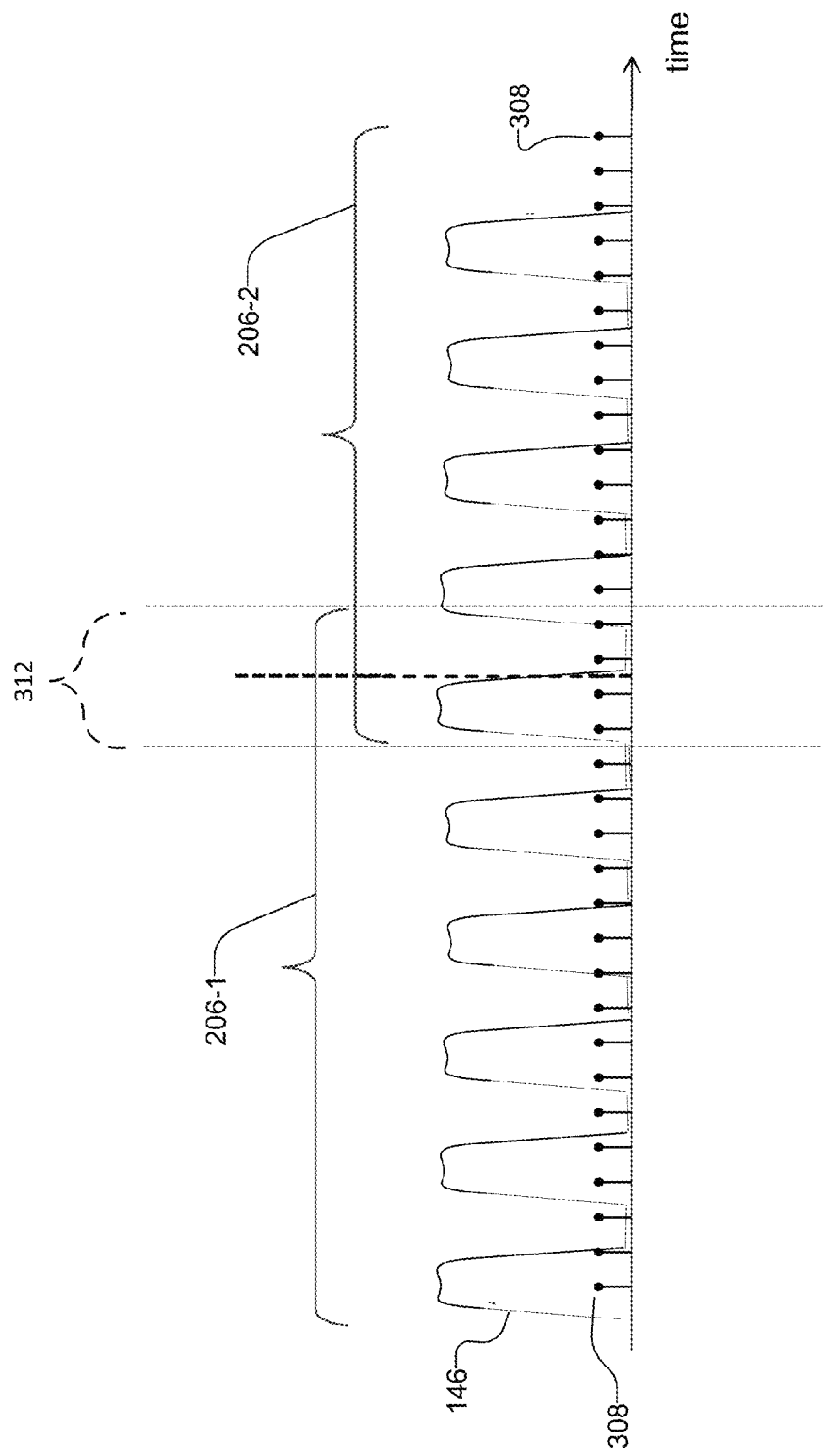

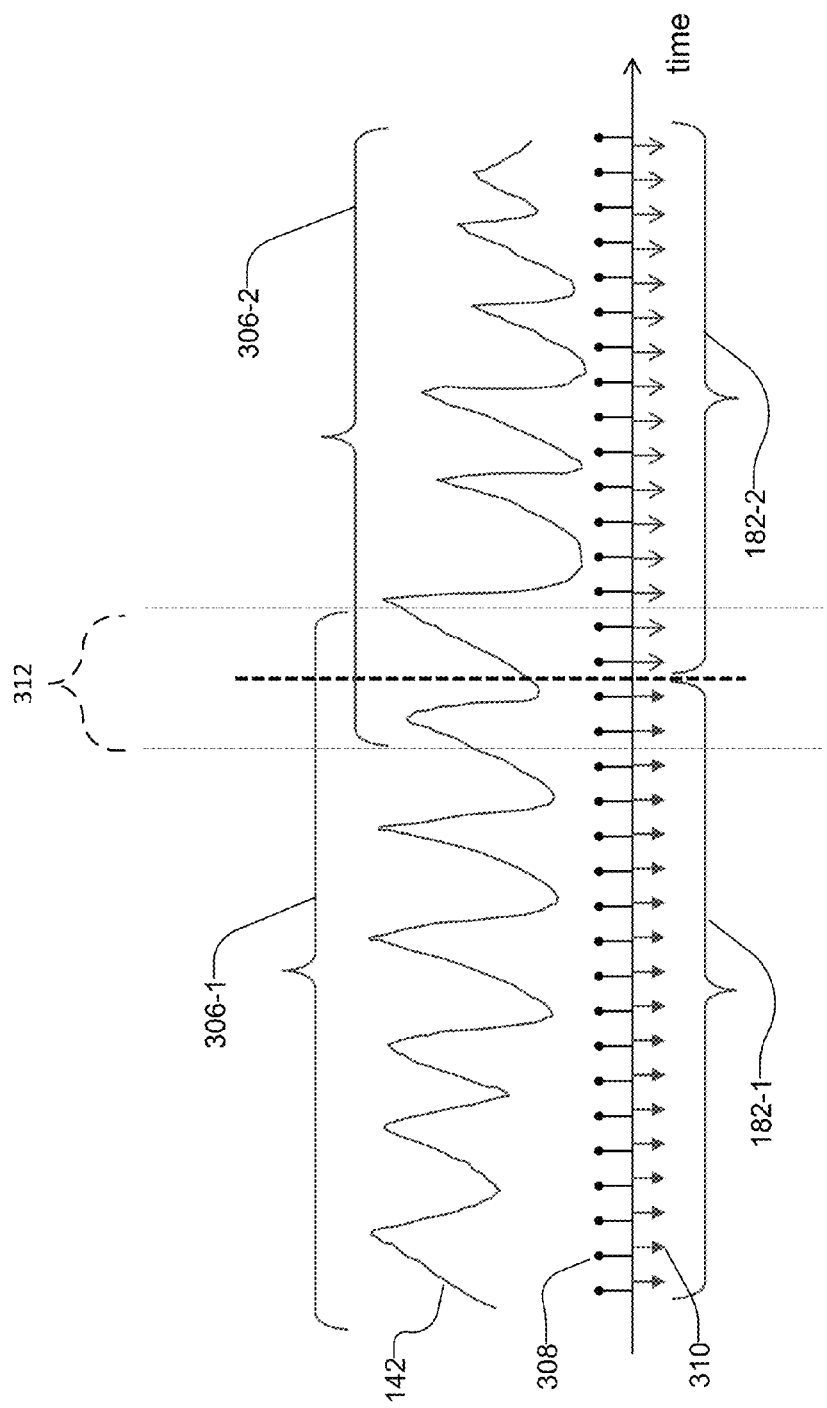

SYSTEM AND METHOD FOR RESAMPLING OPTICAL COHERENCE TOMOGRAPHY SIGNALS IN SEGMENTS

BACKGROUND OF THE INVENTION

Optical coherence tomography ("OCT") is a type of optical coherence analysis that is becoming increasingly popular in research and clinical settings. OCT provides high-resolution imaging of sub-surface features of a sample. This is useful for the in vivo analysis of biological tissues, for example.

The original OCT imaging technique was time-domain OCT (TD-OCT), which used a movable reference mirror in a Michelson interferometer arrangement. A modern optical coherence analysis technique is termed Fourier domain OCT ("FD-OCT,") of which there are generally two types: Spectral Domain OCT and Swept Source OCT.

In both techniques, optical waves that have been reflected from an object or sample are combined with reference waves to produce OCT interference signals. A computer produces axial scans (A-lines) or combines many A-lines into two-dimensional cross sections or three-dimensional volume renderings of the sample by using information on how the waves are changed upon reflection by reference to the reference waves.

Spectral Domain OCT and Swept Source OCT systems differ in the type of optical sources and detectors that they use. Spectral Domain OCT systems typically resolve the spectral components of an interference signal by spatial separation. Spectral Domain OCT systems utilize a broadband optical source and a spectrally resolving detector system to determine the different spectral components in each axial scan of the sample. As a result, the detector system is typically complex, as it must detect the wavelengths of all optical signals in the spectral scan band simultaneously, and then convert them to a corresponding interference dataset. This affects the speed and performance of Spectral Domain OCT systems. In contrast, Swept Source OCT systems encode spectral components in time, not by spatial separation. Swept Source OCT systems typically utilize a single tunable laser source that is swept in wavelength over a scan range or band. The interference signal is detected by a non-spectrally resolving detector system.

Swept Source OCT systems often utilize a sampling clock, or k-clock, that is used in the sampling (including resampling) of the interference signals. Basically, the k-clock is used to correct for non-linearities in the frequency sweeping of the swept source. Some Swept Source OCT systems use a hardware-based k-clock to directly trigger the Analog-to-Digital ("A/D") converter of a Data Acquisition ("DAQ") system that samples the interference signals. Other Swept Source OCT systems sample the k-clock signals in the same manner as the interference signals, creating a k-clock dataset of all sampled k-clock signals and an interference dataset of all sampled interference signals. Then, the k-clock dataset is used to resample the interference dataset in software. This is also known as a software-based k-clock. The resampling provides data that are evenly spaced in the optical frequency domain, or k-space. This provides maximal SNR and axial imaging resolution for subsequent Fourier transform-based signal processing upon the acquired interference signal spectra or interference dataset.

Fourier transform-based signal processing upon the interference signals provides the "A-line" information, or axial scan depth within the sample at each frequency of the reflected light in the resampled interference dataset. The spatial domain signals that include the "A-line" information, in turn, are compiled from many scans to generate a tomographic image or volume data set.

Because of the potentially high processing overhead that resampling of interference datasets and Fourier transform-based signal processing can incur, manufacturers of FD-OCT systems are increasingly turning to special-purpose processing units such as Field-Programmable Gate Arrays ("FPGA"), and General-Purpose Graphical Processing Units ("GPGPU," or "GPU"). For more information, see "Scalable, High Performance Fourier Domain Optical Coherence Tomography: Why FPGAs and Not GPGPUs," Jian Li, Marinko V. Sarunic, Lesley Shannon, School of Engineering Science, Simon Fraser University, Burnaby BC, Canada. Proceedings of the 2011 IEEE 19th Annual International Symposium on Field-Programmable Custom Computing Machines, FCCM '11, 2011.

SUMMARY OF THE INVENTION

Some current systems and methods for software resampling of OCT signals, and techniques for processing the resampled signals into the "A-line" axial profiles of the sample lack computational and computer resource efficiency. The processing burden of the computer systems that perform the resampling increases as the number of sample points generated per scan of the sample increases.

The samples of the interference signals generated from OCT systems are typically not equally (linearly) spaced in k-space. OCT systems must first resample the interference datasets to be linearized such that they are located at equally spaced optical frequency increments. This is because Fourier Transform based algorithms that generate the A-lines from the interference signals require data samples that are linearly spaced in k-space.

The algorithms preferably include Fast Fourier Transforms (FFT) that typically require large amounts of memory and processing power, especially when real-time processing is desired. Selection of FFTs typically involves a cost tradeoff between core size/number of FFT points and the time required to perform the transform, also known as the transform time. The transform time increases with increasing interference dataset width. As a result, operators typically purchase different versions of the OCT equipment in response to their signal processing needs and dataset width, which increases cost.

OCT systems typically resample their interference datasets using linear phase information extracted from the k-clock dataset. Because the linear phase information is evenly spaced in k-space, it can be utilized as a resampling clock. Typically, OCT systems extract the linear phase information from the k-clock dataset using a Hilbert Transform.

Hilbert Transforms utilize multiple FFT-based computations. As a result, the Hilbert transform-based process of extracting phase information from the k-clock dataset typically introduces two additional FFT computations or stages. When combined with the processing associated with the final FFT stage for creating the A-lines from the linearized interference dataset, current OCT systems and methods have poor real-time performance. Though current resampling systems and methods typically utilize GPUs and/or FPGAs to execute computationally intensive resampling algorithms such as the FFT, the current OCT systems and resampling methods typically do not scale with increasing interference signal dataset width.

The present invention can be used to overcome these limitations by providing the ability to divide an interference dataset into an arbitrary number of smaller datasets, or segments. The number of segments is typically selected in conjunction with the FFT/processing core size and transform time to achieve optimum efficiency for the scans of the sample. The invention resamples the segments, and combines or stitches the resampled segments into a reconstructed or linearized interference data set for further processing. Finally, using Fourier Transform based processing of the linearized interference dataset, axial profiles of the sample at different imaging depths can be obtained.

In addition, the invention can also entail dividing the k-clock dataset into segments and processing the segments separately in a fashion similar to the division and processing of the interference datasets. This improves computational efficiency as compared to current OCT systems and methods. By dividing the k-clock dataset into segments, the computationally-intensive, Hilbert Transform-based phase extraction process is performed on the segments. This reduces the processing overhead and memory utilization as compared to performing the Hilbert Transform upon the original, entire k-clock dataset.

The invention combines or stitches adjacent k-clock segments together according to sample points in common between the segments. This creates a phase function for resampling the interference dataset that is equivalent to the phase function extracted from the original k-clock dataset using current systems and methods. The creation of the phase function provided by the present invention can be performed in a more resource and time-efficient manner than current systems and methods, however.

This system can provide several advantages. By breaking the data sets into smaller pieces, the resampling can be performed more efficiently. The smaller data sets enable usage of reduced core size Fourier Transform computing components as compared to the core size or number of sample points required for processing of full data sets using current methods. This can save on component cost and can improve processing speed. The smaller data sets also reduce throughput bottlenecks in the different stages of the resampling and processing of the interference signals as compared to current methods. Moreover, the present invention can also be utilized to limit signal sensitivity "roll off" in the A-lines generated from the linearized interference dataset.

Sensitivity of the interference signals, and therefore the quality of images created from the interference signals, decreases or "rolls off" with increasing spectral bandwidth. The spectral bandwidth is also known as the imaging depth range.

Solutions for minimizing roll-off in the A-lines generated from the interference dataset include expanding the number of samples in the k-clock dataset prior to extracting its linear phase information for resampling of the interference dataset. This is typically performed by multiplying the number of points or samples in the k-clock dataset by a depth factor. The depth factor can be integral or non-integral. In examples, the multiplication includes expanding the number of samples via band-limited interpolation.

Operators of the OCT system select the depth factor experimentally. Multiplying the k-clock dataset by the depth factor increases the number of samples in the k-clock dataset and expands the "grid" of sample points in the k-clock dataset. Resampling the interference dataset using phase information extracted from the expanded k-clock dataset maximizes the effective coherence length of the samples in the resampled interference dataset, also known as the linearized interference dataset. Maximizing the effective coherence length of the samples at depths near the Nyquist frequency during resampling correspondingly minimizes roll-off in A-lines generated from the linearized interference dataset.

In general, according to one aspect, the invention features a method for processing interference signals in an optical coherence tomography system. The method comprises generating k-clock signals in response to frequency sweeping of a swept optical signal, generating interference signals from the swept optical signal, sampling the k-clock signals and the interference signals to generate a k-clock dataset and an interference dataset, creating a clock phase function from the k-clock dataset, dividing the interference dataset into segments of sample points, resampling the segments of the sample points using the clock phase function, and combining the segments of resampled points into a linearized interference dataset.

The method typically performs resampling of the segments of the sample points using a Field Programmable Gate Array and creates the clock phase function by performing a Hilbert Transform upon the k-clock dataset. The method can divide the k-clock data set into phase segments, and creates the clock phase function by performing a Hilbert Transform upon the phase segments and by combining the transformed phase segments.

The method performs a Fourier transform upon the linearized interference dataset to obtain axial profiles of the sample, and combines the segments of resampled points by aligning adjacent segments of the resampled points in time.

The method selects resampling regions of the interference dataset for resampling the segments of the sample points, and selects an overlap region between adjacent resampling regions. The overlap region includes one or more resampled points in common between the adjacent resampling regions.

The method preferably aligns the adjacent segments of the resampled points according to the overlap regions for combining the segments of the resampled points into the linearized interference dataset.

In other aspects, the method performs the resampling of the segments of the sample points by upsampling the segments of the sample points to create transformed segments, performs linear interpolation of the transformed segments to create the segments of the resampled points, and performs an Inverse Fourier Transform upon the segments of the resampled points. The upsampling of the segments of the sample points is typically accomplished by performing a band-limited Fourier Transform upon the segments of the sampling points. The linear interpolation of the transformed segments is typically accomplished by zero-padding the transformed segments.

The method also performs a Fourier transform upon the linearized interference dataset to obtain a point spread function (PSF) of the sample.

In yet another aspect, the method performs the resampling of the segments of the sample points by selecting a resampling region of the interference dataset for each segment of the sample points, wherein each resampling region includes the sample points for each segment, and wherein each resampling region includes additional sample points within an overlap region of the interference dataset. Then, the method performs upsampling of the resampling regions to create transformed resampling regions, and performs linear interpolation of the transformed resampling regions. Finally, the method performs an Inverse Fourier Transform upon the transformed resampling regions to create linearized resampling regions.

The upsampling of the resampling regions is accomplished by performing a band-limited Fourier Transform upon the resampling regions to create the transformed resampling regions. The linear interpolation of the transformed resampling regions is accomplished by zero-padding the transformed resampling regions. The method combines the segments of resampled points into the linearized interference dataset by preferably aligning their linearized resampling regions according to the sample points in the overlap regions.

In general, according to another aspect, the invention features a system for processing interference signals in an optical coherence tomography system. The system comprises a k-clock module that generates k-clock signals in response to frequency sweeping of a swept optical signal, an interferometer that generates interference signals from the swept optical signal, a data acquisition system that samples the k-clock signals and the interference signals to generate a k-clock dataset and an interference dataset, and a rendering system. This rendering system creates a clock phase function from the k-clock dataset, divides the interference dataset into segments of sample points, resamples the segments of the sample points using the clock phase function, and combines the segments of resampled points into a linearized interference dataset.

The rendering system can also divide the interference dataset into the segments of the sample points in response to imaging depth of the interference signals upon the sample. In addition, the rendering system includes computer memory utilized during the resampling of the segments of the sample points, and divides the interference dataset into the segments of the sample points in response to depth of the computer memory.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 is an frequency vs. time plot of a k-clock dataset, and illustrates an exemplary division of the k-clock dataset into overlapping k-clock segments;

FIG. 5 is a frequency vs. time plot of an interference dataset, and illustrates an exemplary division of the interference dataset into the segments of sample points, and division of the interference dataset into resampling regions;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. It will be further understood that the terms such as includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element is referred to and/or shown as being connected or coupled to another element, it can be directly connected or coupled to the other element or intervening elements may be present.

Figure 1:
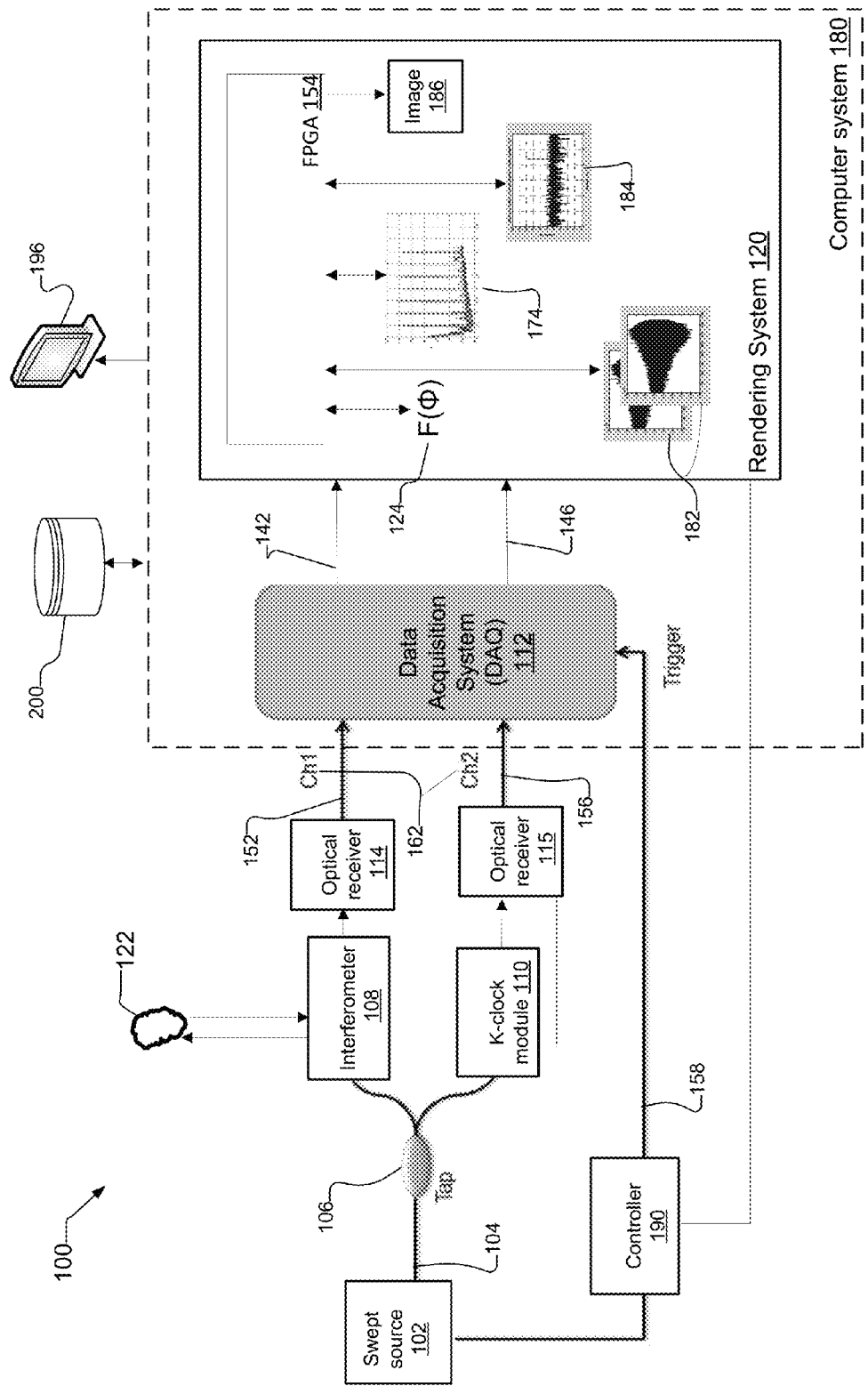
FIG. 1 is a schematic diagram of an optical coherence analysis system according to principles of the present invention.

FIG. 1 shows an optical coherence tomography analysis system, or OCT system 100 to which the present invention is applicable. The OCT system 100 uses a swept source 102 to generate swept optical signals on optical fiber 104. The swept source 102 is typically a tunable laser designed for high speed spectral sweeping. The swept optical signals are narrowband emissions that are scanned, or "swept," over a spectral scan band.

Tunable lasers are constructed from a gain element such as a semiconductor optical amplifier ("SOA") that is located within a resonant laser cavity, and a tuning element such as a rotating grating, a grating with a rotating mirror, or a Fabry-Perot tunable filter. Currently, some of the highest speed tunable lasers are based on the laser designs described in U.S. Pat. No. 7,415,049 B1, entitled "Laser with Tilted Multi Spatial Mode Resonator Tuning Element," by D. Flanders, M. Kuznetsov and W. Atia, which is incorporated herein by this reference in its entirety.

Another technology for high-speed swept sources is termed tunable amplified spontaneous emission (ASE) sources. An example of an ASE swept source is described in U.S. Pat. No. 8,526,472 B1, "ASE Swept Source with Self-Tracking Filter for OCT Medical Imaging," by D. Flanders, M. Kuznetsov and W. Atia, which is incorporated herein by this reference in its entirety.

A fiber coupler 106 or other optical splitter divides the swept optical signal from the swept source 102 into a portion that is provided to an OCT interferometer 108 and a portion that is provided to a k-clock module 110. In alternate embodiments, the swept optical signal could be transmitted in free space or internally as part of an integrated system that includes the swept source 102, interferometer 108, and the k-clock module 110.

A controller 190 controls the swept source 102 using a source control signal that configures the swept source 102 to scan over the scan band. The controller 190 also controls a Data Acquisition System ("DAQ") 112.

In the current embodiment, the interferometer 108 is a Mach-Zehnder-type that sends optical signals to a sample 122, analyzes the optical signals reflected from the sample 122, and generates an optical interference signal in response.

In the illustrated embodiment of the OCT system 100, the optical interference signal generated by the sample interferometer 108 is detected by a sample optical receiver 114. The optical receiver 114 converts the optical interference signal into an electronic interference signal 152. In the preferred embodiment, the sample optical receiver 114 is a balanced detector system, which generates the electronic interference signal 152.

The k-clock module 110 generates optical k-clock signals at equally spaced optical frequency sampling intervals as the swept optical signal is tuned or swept over the scan band. Optical receiver 115 detects the optical signals generated by the k-clock module 110 and converts the optical signals into electronic k-clock signals 156. The electronic k-clock signals 156 are used by the data acquisition system 112 to track the frequency tuning of the optical swept source 102.

There are a number of ways to implement the k-clock module 110. One example utilizes a Michelson interferometer. These generate a sinusoidal response to the frequency scanning of the swept optical signal. In specific implementations, a fiber Michelson interferometer is used. In other implementations, etalons are used in the k-clock module 110 to filter the swept optical signal. An example of a clock integrated with a swept source laser is described in U.S. Pat. No. 8,564,783 B2 "Optical Coherence Tomography Laser with Integrated Clock," by D. Flanders, W. Atia, B. Johnson, M. Kuznetsov, and C. Melendez, which is incorporated herein by this reference.

The DAQ 112 accepts the electronic interference signals 152 and the electronic k-clock signals 156 on input channels Ch1, Ch2 of the DAQ 112. The DAQ 112 accepts a sweep trigger signal 158 indicating the start of the sweeps of the swept source 102.

Based on an initial signal sampling rate, the DAQ 112 performs analog to digital conversion to sample the electronic k-clock signals 156 and electronic interference signals 152 for the scan band into a k-clock dataset 146 and interference dataset 142, respectively. A rendering system 120 accepts the k-clock dataset 146 and interference dataset 142 as inputs, and performs operations upon the datasets to create interferometric A-line 184 depth scans of the sample.

The DAQ 112 and the rendering system 120 are preferably included as part of a computer system 180. The controller 190, in one example, accepts commands from software running on the computer system 180 to control components of the OCT system 100 such as the rendering system 120.

The rendering system 120 preferably includes an FPGA 154 or other data processing system that implements resampling algorithms for resampling of the interference dataset 142. The rendering system 120 creates a clock phase function 124, also labeled as $F(\varphi)$, from phase information extracted from the k-clock dataset 146.

The interference dataset 142 is spaced uniformly in time, but non-uniformly in frequency. In examples, the rendering system 120 uses the phase function 124 to resample the interference dataset 142 to produce a frequency-uniform version of the interference dataset 142. The frequency-uniform version of the interference dataset 142 is also known as a linearized interference dataset 174. The rendering system 120 creates the linearized interference dataset 174 to enable subsequent Fourier Transform based signal processing upon the linearized interference dataset 174. This creates reflectivity profiles, or A-lines 184 of the sample 122 from interference dataset 174.

The Fourier Transform based processing preferably utilizes a Fast Fourier Transform (FFT). The memory associated with performing FFT calculations is often referred to as the FFT core. The FFT core is capable of performing resampling of signals using a maximum number of sampling points per resampling cycle, such as 4096 or 8192, in examples. This is also known as the memory depth of the FFT core. In examples, a 12-bit FFT core can provide 2 exp 12=4096 samples per resampling cycle, and a 13-bit FFT core can provide 2 exp 13=8092 samples per resampling cycle.

To achieve maximum efficiency of the FFT-based processing of the interference dataset 142, operators optimally select an FFT core with memory depth that is equal to or greater than the expected number of sample points in the dataset. However, the cost of FFT cores and their support logic increases significantly with increasing core size. Moreover, as business demands require operators to create ever increasing dataset sizes, current systems and methods typically do not scale with increasing dataset size. FFT cores typically cannot be removed and replaced in response to changing operational conditions in a cost-effective manner.

To address this problem, the rendering system 120 preferably divides the interference dataset 142 into segments of sample points. The rendering system 120 typically divides the number of samples in the interference dataset by the FFT core depth to determine the number of segments of the sample points. The FPGA 154 accepts the segments of sample points, resamples them using the phase function 124 into segments of resampled points 182, and creates a linearized interference dataset 174 by combining the segments of resampled points 182. The FPGA 154 then performs a final Fourier Transform upon the linearized interference dataset 174 to create the axial profiles 184 of the sample. 122. With the assistance of the FPGA 154, the rendering system 120 combines the axial profiles or A-lines 184 to create 2D and 3D images 186 of the sample 122.

The computer system 180 communicates with a display device 196 for displaying information about the OCT system 100 and its components to the operator. The computer system 180 preferably stores data related to scanning of the sample 122 to a media storage device 200, such as a database.

Figure 2A:
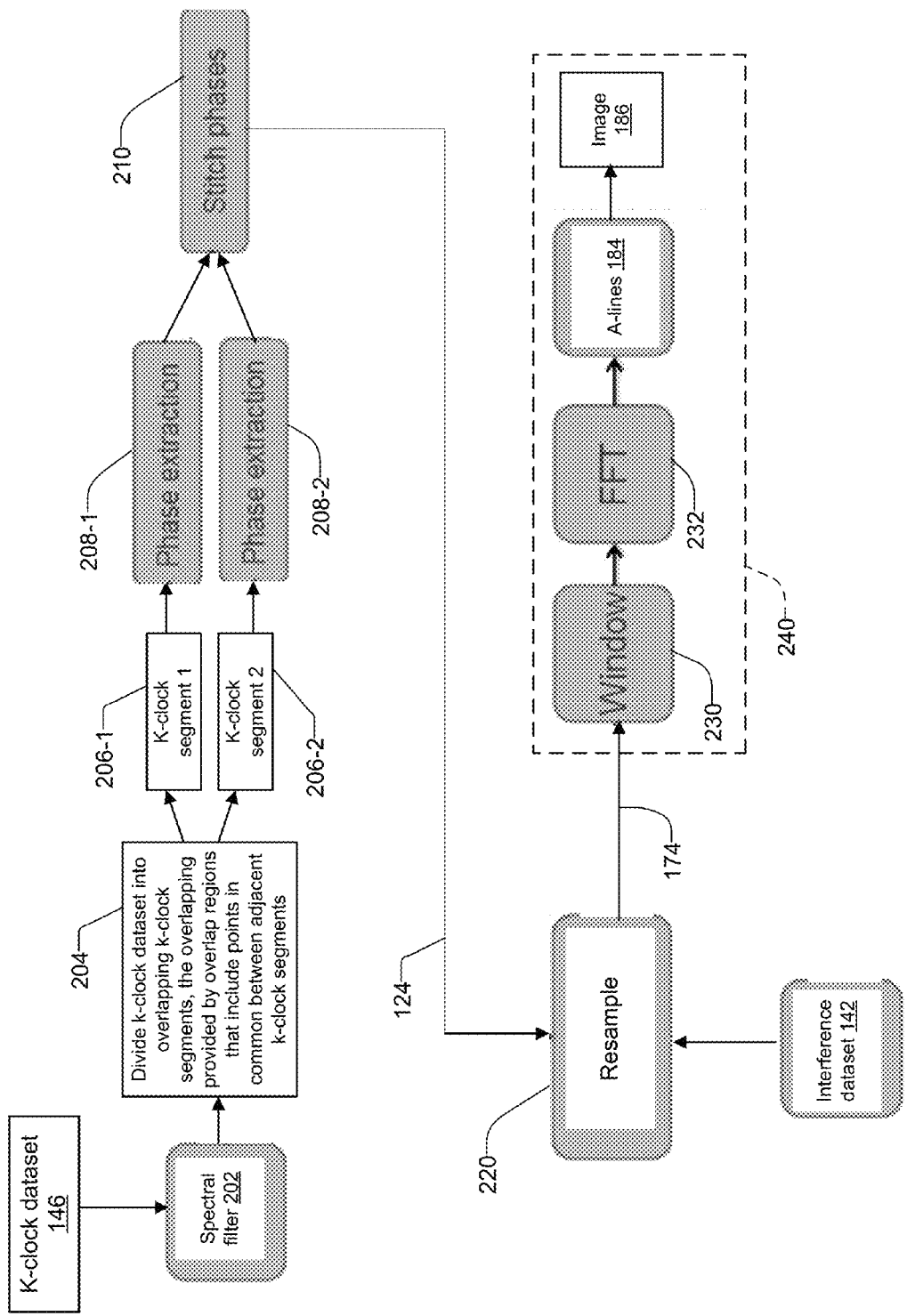
FIG. 2A is a block diagram of one method for processing interference datasets for creating axial profiles and tomographic images of a sample, utilizing a k-clock divided into overlapping k-clock segments.

FIG. 2A shows a block diagram of a method for creating interferometric depth profiles or A-lines 184 of the sample 122 and tomographic images 186 from the A-lines 184 using an OCT system 100 such as that of FIG. 1.

An operator uses the OCT system 100 to scan a sample 122 and create a k-clock dataset 146 and an interference dataset 142. The k-clock dataset 146 is then passed through spectral filter 202 to remove artifacts in the signals of the k-clock dataset 146. The artifacts are typically associated with optical imperfections in the k-clock module 110. The k-clock dataset 146, in step 204, is then divided into one or more overlapping k-clock segments 206 of sampling points 308 in response to memory space requirements of the rendering system 120.

In FIG. 2A, the k-clock dataset 146 has been divided into multiple k-clock segments. In the example, two segments 206-1 and 206-2 are shown. In some examples, the k-clock dataset 146 has been divided into five (5) or more k-clock segments, and divided into even more than ten (10) in still other examples. The overlapping of the k-clock segments 206-1 and 206-2 is provided by an overlap region 312 that include points in common between adjacent k-clock segments 206-1 and 206-2. In one implementation, the rendering system 120 divides the k-clock dataset 146 into the fewest number of segments 206 having a number of samples less than or equal to the FFT core depth of the FPGA 154. In another example, an operator performs this step manually.

In phase extraction steps 208-1 and 208-2, the rendering system 120 extracts linear phase information from the real component of k-clock segments 206-1 and 206-2, respectively. Preferably, the rendering system 120 uses a Hilbert Transform to extract the phase information. Hilbert Transforms include at least two memory-intensive FFT operations for extracting phase information from the k-clock dataset 146. In addition, as the operator increases the number of samples in the k-clock dataset 146 above the FFT core depth, the number of FFT operations required increases. Performing separate Hilbert Transforms on the smaller k-clock segments 206-1 and 206-2 typically provides more efficient utilization of system resources than performing a Hilbert transform on the entire k-clock dataset 146.

In step 210, the rendering system 120 combines or stitches the extracted phases 208-1 and 208-2 into a linear phase function 124, using the regions of overlap in the original segments 206. The rendering system 120 accepts the interference dataset 142, and in step 220, resamples the interference dataset 142 using the phase function 124 to create a linearized interference dataset 174. In examples, the resampling includes linear interpolation between samples in the k-clock dataset 146 and band-limited interpolation of the samples in the interference dataset 142. The method then performs a final processing stage 240 upon the linearized interference dataset 174.

For the final processing stage 240, the method first eliminates edge effects and noise in the linearized interference dataset 174 using a windowing function, such as a Hanning window, in step 230. According to step 232, the method accepts the windowed linearized interference dataset 174 and performs an FFT to create A-lines 184 for each sample location in the linearized interference dataset 174. Finally, the method combines the A-lines 184 into 2D and 3D tomographic images 186 of the sample 122 to complete the final processing stage 240.

In examples, the rendering system 120 in conjunction with the DAQ 112 resamples the interference dataset 142 by upsampling the interference dataset 142 via linear interpolation, followed by zero-padding of the frequency spectra. In other examples, the rendering system 120 resamples the interference dataset 142 by performing a band-limited Fast Fourier Transform (FFT) upon the interference dataset 142.

Figure 2B:
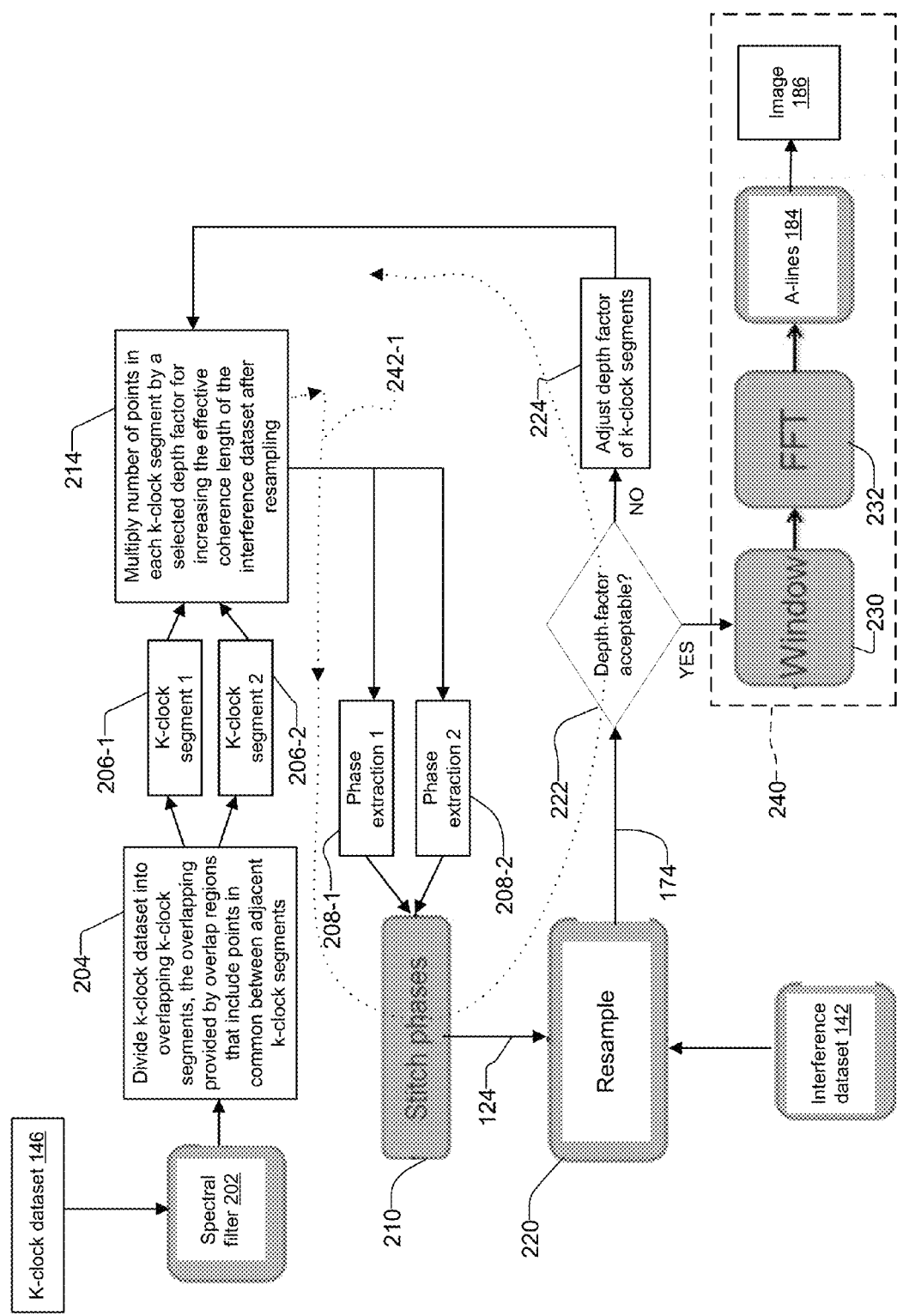
FIG. 2B is a block diagram of another method for processing interference datasets that is substantially similar to the method of FIG. 2A, additionally multiplying the number of samples in the k-clock segments for increasing the effective coherence length of the interference dataset during resampling.

FIG. 2B shows another method for processing interference datasets 146 that is substantially similar to the method of FIG. 2A. The method additionally multiplies the number of samples in the k-clock segments 206 prior to resampling the interference dataset 142 for increasing the effective coherence length of the interference dataset 142 after resampling.

The method spectrally filters the k-clock dataset in step 202 and divides the k-clock dataset 146 in step 204 into overlapping k-clock segments 206 as in the method of FIG. 2A. However, prior to phase extraction of the k-clock segments 206, the method multiplies the number of points in the k-clock segments 206 by a selected depth factor in step 214. The depth factor can be integer or non-integer in value.

During the phase extraction process, the method extracts sample points from the k-clock segments 206 according to the depth factor for resampling the signals in the interference dataset 142 to a desired imaging depth. Increasing the depth factor by value X, where X is integer or non-integer, correspondingly extracts X times the number of points from the k-clock segments 206, and correspondingly resamples the signals in the interference dataset 142 to X times the effective coherence length/depth. Experimentation has shown, however, that higher multiples for the depth factor may introduce artifacts in the linearized interference dataset 174.

After expanding the number of points in the k-clock segments 206 in step 214, the method extracts linear phase information 208-1 and 208-2 from the expanded/multiplied k-clock segments 206-1 and 206-2. The method stitches the phase information in step 210 to create phase function 124 and resamples the interference dataset 142 in step 220 to create the linearized interference dataset 174.

In step 222, the method provides the operator with the ability to determine if the effective coherence length of the linearized interference dataset 174 is maximized at imaging depths near the Nyquist frequency upon resampling. If this is true, the method performs the same steps associated with the final processing stage 240 in the method of FIG. 2A to create the A-lines 184 and the tomographic images 186 of the sample 122.

If the operator is not satisfied with the results of the test in step 222, the operator adjusts the depth factor of the k-clock segments in step 224.

The adjustment of the depth factor in step 224 is a step included within an iterative depth factor processing loop 242-1. The depth factor processing loop 242-1 provides the operator with the ability to maximize the effective coherence length of the linearized interference dataset 174, and therefore to maximize the depth resolution of A-lines 184 and images 186 created from the linearized interference dataset 174.

Specifically, the depth factor processing loop 242-1 includes the following steps: step 214 to multiply/expand the number of points in the k-clock segments 206 for a selected depth factor; phase extraction step 208; step 210 for stitching the extracted phases to create the linear phase function 124; step 220 for resampling the interference dataset 142 using the expanded "grid" of linearly-spaced samples in k-space of the linear phase function 124; step 222 to test for maximum effective coherence length of the linearized interference dataset 174; and, step 224 to adjust the depth factor of the k-clock segments and repeat the steps of the depth factor processing loop 242-1 if the test in step 222 does not yield the desired or maximum effective coherence length of the linearized interference dataset 174.

The depth factor processing loop 242-1 exits if the operator is satisfied in step 222 that the effective coherence length of the linearized interference dataset 174 is maximized. The method then completes the steps associated with final processing stage 240.

In step 222, the operator can save the linearized interference dataset 174 and the k-clock segments 206 to database 200. In this way, the operator can store and retrieve the output from each iteration of the depth factor processing loop 242-1 based on experimental results. The operator also has the ability to store the A-lines 184 and the images 186 generated from final processing stage 240 to the database 200.

FIG. 3 shows an exemplary k-clock dataset 146 divided into segments by the rendering system 120 in response to system memory requirements. The electronic k-clock signal 156 is sampled by the DAQ 112 at samples 308 to create the k-clock dataset 146. The rendering system 120 then breaks or divides the k-clock dataset 146 into overlapping segments of the sample points 206. In the example, the k-clock dataset 146 is divided into two segments of the sample points 206-1 and 206-2.

For the methods of FIGS. 2A and 2B included herein above, the rendering system 120 preferably selects an overlap region 312 between adjacent k-clock segments 206, such as between k-clock segments 206-1 and 206-2. The overlap region 312 includes sample points 308 in common between adjacent k-clock segments 206-1 and 206-2. Preferably, the overlap region 312 includes at least 10% of the sample points 308 in common with adjacent k-clock segments 206-1 and 206-2. The methods of FIGS. 2A and 2B utilize the common sample points 308 in the overlap region 312 when performing the phase stitching step 210 that creates the linear phase function 124.

Figure 4A:
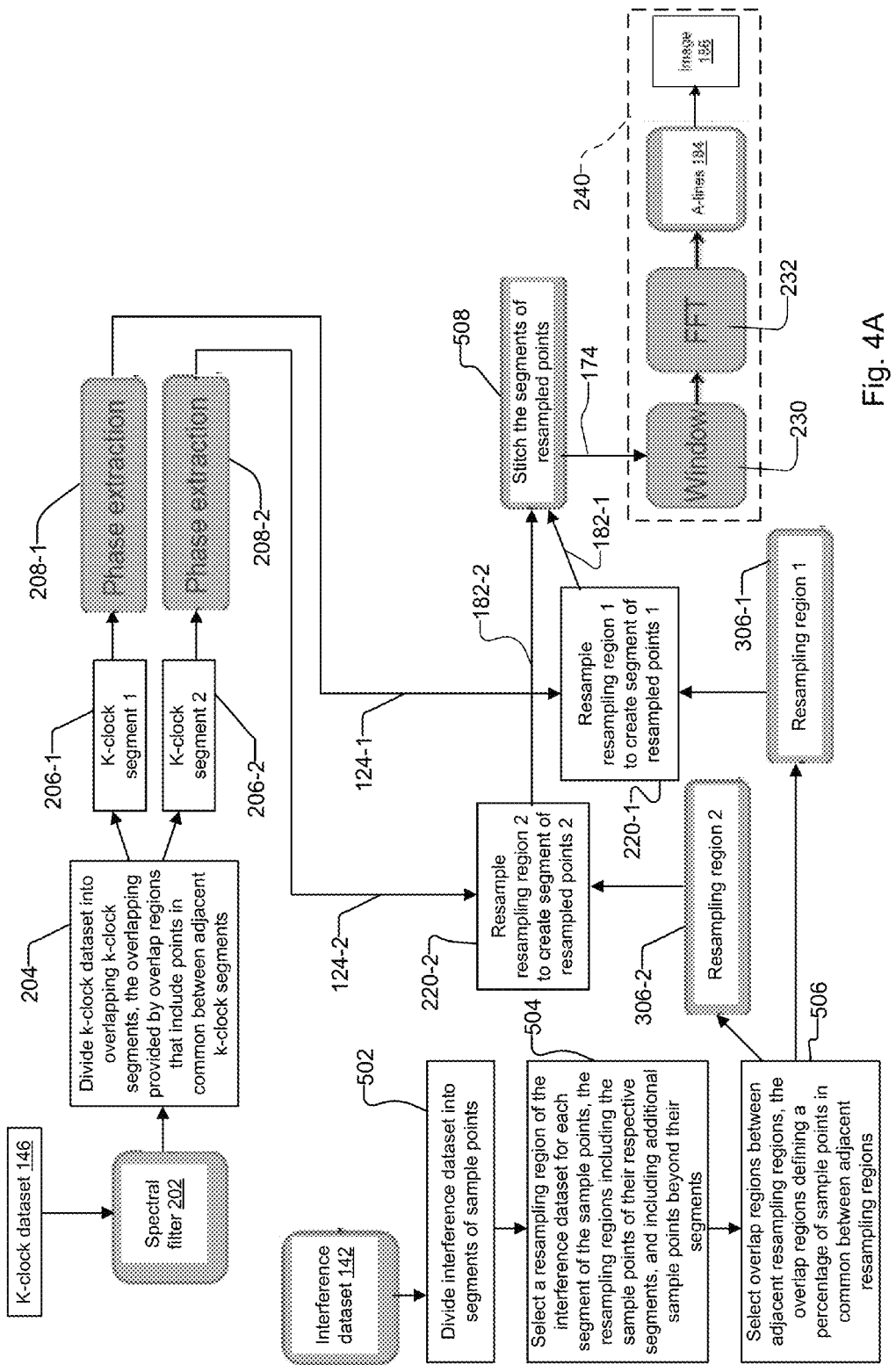
FIG. 4A is a block diagram of another method for processing interference datasets, where the processing utilizes a k-clock divided into overlapping k-clock segments and an interference dataset divided into segments of sampling points and overlapping resampling regions.

FIG. 4A shows yet another method for processing interference datasets 142 in an OCT system 100. The method spectrally filters the k-clock dataset in step 202 and divides the k-clock dataset 146 in step 204 into overlapping k-clock segments 206 as in the method of FIG. 2A. However, after performing the phase extraction steps 208-1 and 208-2 from the k-clock segments 206-1 and 206-2, the method saves the extracted phase information as separate linear phase functions 124-1 and 124-2 without combining/stitching them into a single phase function 124 as in the methods of FIGS. 2A and 2B.

In parallel, in step 502, the method divides the interference dataset 142 into segments of sample points 308. In step 504, the method then selects a resampling region 306 of the interference dataset 142 for each segment of the sample points 308, the resampling regions 306 including the sample points 308 of their respective segments, and including additional sample points 308 beyond their segments. According to step 506, the method then selects overlap regions 312 between adjacent resampling regions 306, the overlap regions 312 defining a percentage of sample points in common between adjacent resampling regions 306.

In FIG. 4A, the interference dataset 142 has been divided into multiple segments, such as two, of the sample points 308 with associated resampling regions 306-1 and 306-2. In one implementation, the rendering system 120 divides the interference dataset 142 into the fewest number of segments/resampling regions 306 having a number of samples less than or equal to the FFT core depth of the FPGA 154. In another example, an operator performs this step manually. In some examples, the interference dataset 142 is divided into five (5) or more segments, and divided into even more than ten (10) in still other examples.

In steps 220-1 and 220-2, the method resamples resampling regions 306-1 and 306-2 using the previously extracted linear phase functions 124-1 and 124-2, respectively. This creates linearized segments of resampled points 182-1 and 182-2, respectively. Then, in step 508, the rendering system 120 stitches the segments of the resampled points 182-1 and 182-2 to create the linearized interference dataset 174. As in the methods of FIGS. 2A and 2B, the method performs final processing stage 240 upon the linearized interference dataset 174 to create the A-lines 184 and the 2D and 3D tomographic images 186 of the sample 122.

Figure 4B:
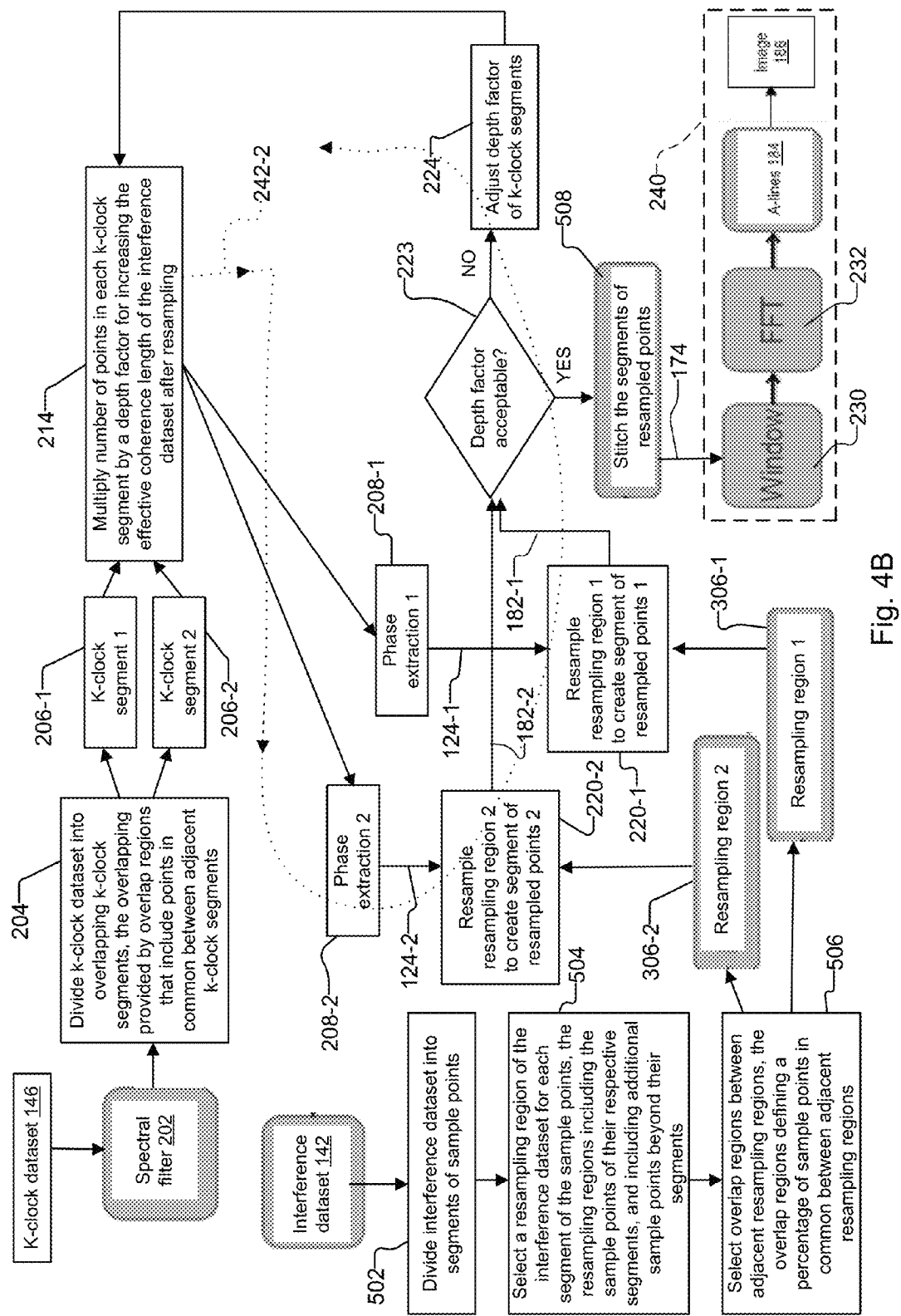
FIG. 4B is a block diagram of another method for processing interference datasets that is substantially similar to the method of FIG. 4A, additionally multiplying the number of samples in the k-clock segments for increasing the coherence length of the interference dataset segments of the sample points and resampling regions during resampling.

FIG. 4B shows yet another method for processing interference datasets 146 that is substantially similar to the method of FIG. 4A. As in the method of FIG. 2A, the method of FIG. 4B additionally multiplies the number of samples in the k-clock segments 206 prior to resampling the interference dataset 142 for increasing the effective coherence length of the samples in the interference dataset 142 during resampling.

The method spectrally filters the k-clock dataset 146 in step 202 and divides the k-clock dataset 146 in step 204 into overlapping k-clock segments 206 as in the method of FIG. 4A. However, prior to extracting phase information from the k-clock segments 206, the method multiplies the number of points in the k-clock segments 206 by a depth factor in step 214. The depth factor can be integral or non-integral in value.

After performing the phase extraction steps 208-1 and 208-2 from the k-clock segments 206-1 and 206-2, the method saves the extracted phase information as separate linear phase functions 124-1 and 124-2 without combining/stitching them into a single phase function 124 as in the methods of FIGS. 2A and 2B.

In parallel, in step 502, the method divides the interference dataset 142 into segments of sample points 308. In step 504, the method then selects a resampling region 306 of the interference dataset 142 for each segment of the sample points 308, the resampling regions 306 including the sample points 308 of their respective segments, and including additional sample points 308 beyond their segments. According to step 506, the method then selects overlap regions 312 between adjacent resampling regions 306, the overlap regions 312 defining a percentage of sample points in common between adjacent resampling regions 306.

After expanding the number of points in the k-clock segments 206 in step 214, the method extracts linear phase information 208-1 and 208-2 from the expanded/multiplied k-clock segments 206-1 and 206-2, respectively. The method then operates in a substantially similar way as the method of FIG. 4A for resampling the resampling regions 306-1 and 306-2 in steps 220-1 and 220-2, creating segments of the resampled points 182-1 and 182-2, respectively.

Then, in step 223, the operator tests if the effective coherence length of the segments of the resampled points 182-1 and 182-2 are maximized at imaging depths near the Nyquist frequency upon resampling. If this is true, in step 508, the method stitches the segments of the resampled points 182-1 and 182-2 to create the linearized interference dataset 174. Upon completion of step 508, as in the methods of FIGS. 2A, 2B, and 4A, the method performs the steps associated with the final processing stage 240 to create the A-lines 184 and the tomographic images 186 of the sample 122.

If the operator is not satisfied with the results of the test in step 223, the operator adjusts the depth factor of the k-clock segments in step 224.

The adjustment of the depth factor in step 224 is a step included within an iterative depth factor processing loop 242-2. The depth factor processing loop 242-2 provides the operator with the ability to maximize the effective coherence length of the segments of the resampled points 182-1 and 182-2. Because the segments of the resampled points 182-1 and 182-2 are ultimately stitched into a linearized interference dataset 174 in step 508, the depth resolution of A-lines 184 and images 186 created from the linearized interference dataset 174 are correspondingly maximized.

Specifically, the depth factor processing loop 242-2 includes the following steps: step 214 to multiply/expand the number of points in the k-clock segments 206-1 and 206-2 for the selected depth factor; phase extraction step 208-1 and 208-2 to create the linear phase functions 124-1 and 124-2; steps 220-1 and 220-2 for resampling the resampling regions 306-1 and 306-2 using the expanded "grid" of linearly-spaced samples in k-space of the linear phase functions 124-1 and 124-2, respectively; step 223 to test for maximum effective coherence length of the resulting segments of the resampled points 182-1 and 182-2; and, step 224 to adjust the depth factor of the k-clock segments and repeat the steps of the depth factor processing loop 242-1 if the test in step 223 does not yield the desired or maximum effective coherence length of the segments of the resampled points 182-1 and 182-2.

The depth factor processing loop 242-2 exits if the operator is satisfied in step 223 that the effective coherence length of the segments of the resampled points 182-1 and 182-2 is maximized. The method then transitions to step 508 to stitch the segments of the resampled points 182-1 and 182-2 into the linearized interference dataset 174 and complete final processing stage 240.

In step 223, the operator can save the segments of the resampled points 182, the linearized interference dataset 174 and the k-clock segments 206 to database 200. In this way, the operator can store and retrieve the output from each iteration of the depth factor processing loop 242-2 based on experimental results. The operator also has the ability to store the A-lines 184 and the images 186 generated from final processing stage 240 to the database 200.

FIG. 5 shows an exemplary interference dataset 142 including sample points 308 as previously described in the methods of FIGS. 2A/2B and 4A/4B herein above. The DAQ 112 creates the interference dataset 142 by sampling the interference signals at the sample points 308. In the methods of FIG. 2A/2B, the interference dataset 142 is resampled "as is." In the methods of FIG. 4A/4B, the interference dataset 142 is divided into two or more segments of sample points.

For the methods of FIG. 4A/4B, the rendering system 120 preferably selects resampling regions 306 of the interference dataset 142 for resampling the segments of the sample points 308. In the example of FIG. 5, the rendering system selects two overlapping resampling regions 306-1 and 306-2.

In conjunction with the DAQ 112, the rendering system 120 resamples the segments of sample points to create segments of resampled points 306. The rendering system 120 preferably selects an overlap region 312 between adjacent resampling regions 306-1 and 306-2. The overlap region 312 includes resampled points 310 in common between resampling regions 306-1 and 306-2. Preferably, the overlap region 312 includes at least 5%, but can be at least 10%, of the resampled points 310 in common between resampling regions 306-1 and 306-2. The rendering system aligns the adjacent segments of the resampled points 182-1 and 182-2 according to the overlap regions 312 for combining the segments of the resampled points 182-1 and 182-2 into the linearized interference dataset 174.

Figure 6A:
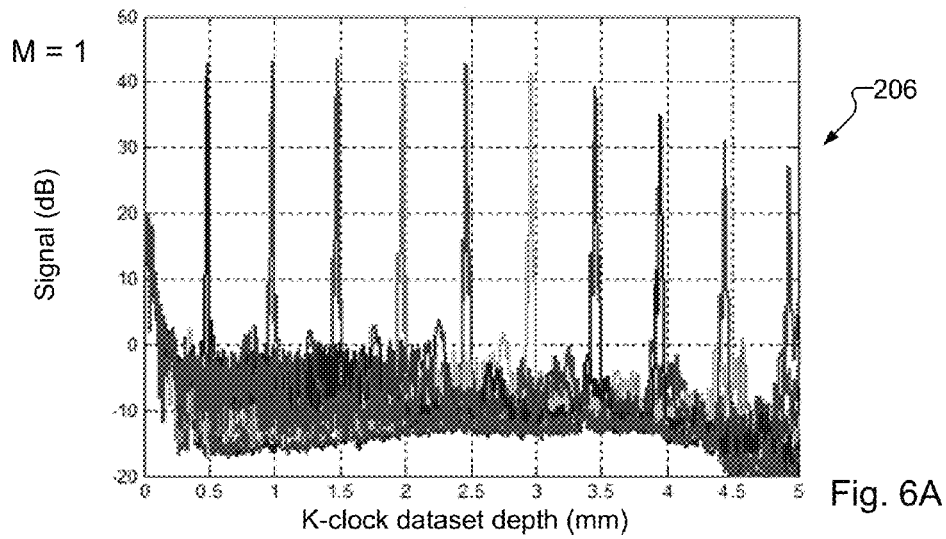
FIG. 6A-6C show plots of an exemplary k-clock segment that has its number of samples expanded by multiplying the samples by depth factors of 1×, 2×, and 3× the number of samples, respectively, for resampling an interference dataset at a 5 mm Nyquist imaging depth.
Figure 6B:
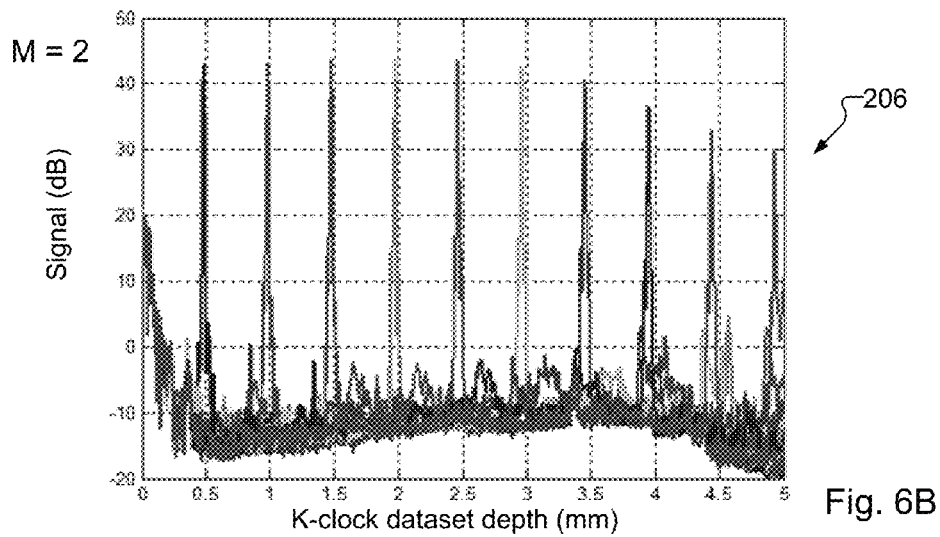
Figure 6C:
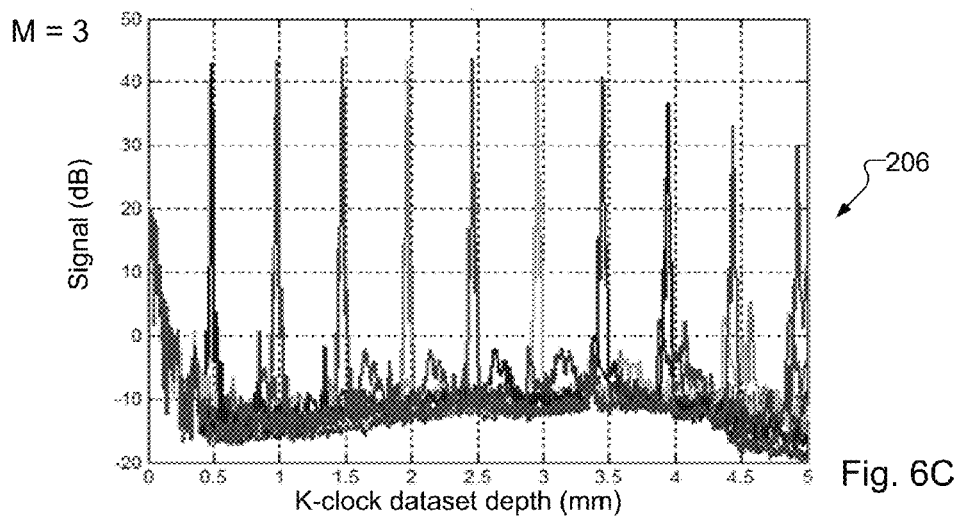
Figure 7A:
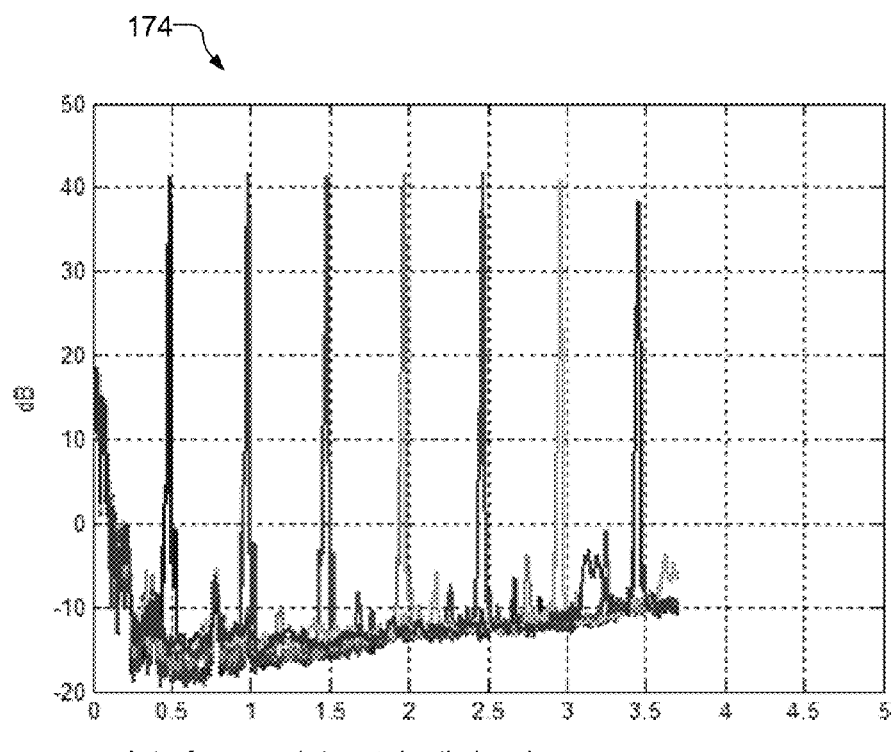
FIG. 7A shows a plot of an interference dataset resampled using the k-clock segment of FIG. 6A, illustrating that using a depth factor of 1× the number of k-clock segment samples for resampling the interference dataset was not experimentally sufficient to provide maximum effective coherence length near a 5 mm Nyquist imaging depth.
Figure 7B:
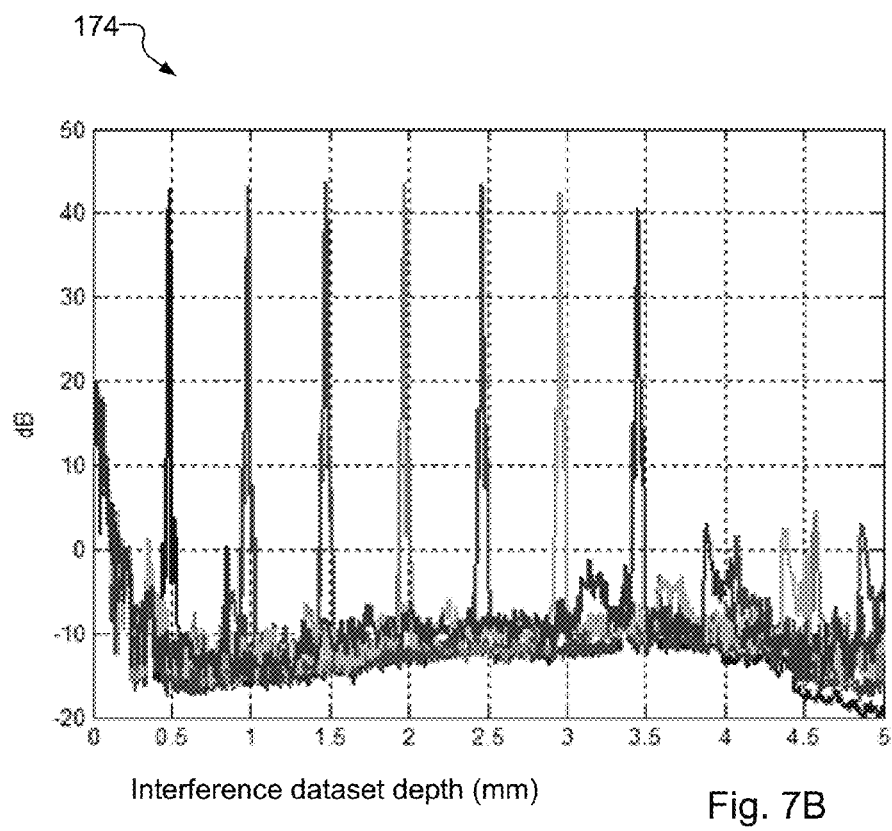
FIG. 7B shows a plot of an interference dataset resampled using the k-clock dataset of FIG. 6B, illustrating that using a depth factor of 2× the number of k-clock segment samples was experimentally sufficient to provide maximum effective coherence length near a 5 mm Nyquist imaging depth.

FIG. 6A-6C show exemplary k-clock segments 206 created during the execution of the method of FIG. 2B. FIGS. 7A and 7B display linearized interference datasets 174 created using the k-clock segments 206 in FIGS. 6A and 6B, respectfully.

FIG. 6A shows an exemplary k-clock dataset segment 206 created using the method of FIG. 2B. The k-clock dataset segment 206 was created using a selected depth factor of 1, indicated in the figure as M=1. While the k-clock dataset segment 206 was created using the method of FIG. 2B, the principles can be similarly applied to the execution of the method of FIG. 4B.

The associated resampling rate of the k-clock segments 260 in the method of FIG. 2B was selected at 550M samples/sec, which has an associated Nyquist frequency of 275 MHz. Correspondingly, the maximum effective coherence length in the linearized interference dataset 174 will be at depths near the Nyquist depth, or 5 mm.

FIG. 7A shows the linearized interference dataset 174 created using the k-clock dataset segment 206 of FIG. 6A with selected depth factor of M=1. According to the test in the method of FIG. 2B step 222, the linearized interference dataset 174 of FIG. 7A does not include signals/points near the desired 5 mm Nyquist depth for maximizing effective coherence length and minimizing roll-off. As a result, the operator increases the depth factor by a factor of two in the method of FIG. 2B step 224 to expand the "grid" of samples in the k-clock segment 206.

FIG. 6B shows k-clock dataset segment 206 created as a result of expanding the depth factor of the k-clock segment 206 of FIG. 6A by a factor of two, indicated in FIG. 6B as M=2. FIG. 7B shows the linearized interference dataset 174 created using the k-clock dataset segment 206 of FIG. 6B with selected depth factor of M=2.

According to the test in the method of FIG. 2B step 222, the linearized interference dataset 174 of FIG. 7B now includes signals/points near the 5 mm Nyquist depth for maximizing effective coherence length and minimizing roll-off. As a result, the method of FIG. 2B exits the depth factor processing loop 242-1 and completes final stage processing 240 to create the A-lines 184 and images 186.

FIG. 6C shows k-clock dataset segment 206 created as a result of expanding the depth factor of the k-clock segment 206 of FIG. 6A by a factor of three, indicated in FIG. 6C as M=3. The linearized interference dataset 174 created using the k-clock segment 206 of FIG. 6C did not experimentally provide improved effective coherence length as compared to the results of the linearized interference dataset 174 in FIG. 7B created using the k-clock segment 206 of FIG. 6C with selected depth factor of M=3. As a result, the operator discontinued experimental adjustment of the depth factor and utilized the results associated with FIGS. 6B and 7B.

Figure 8A:
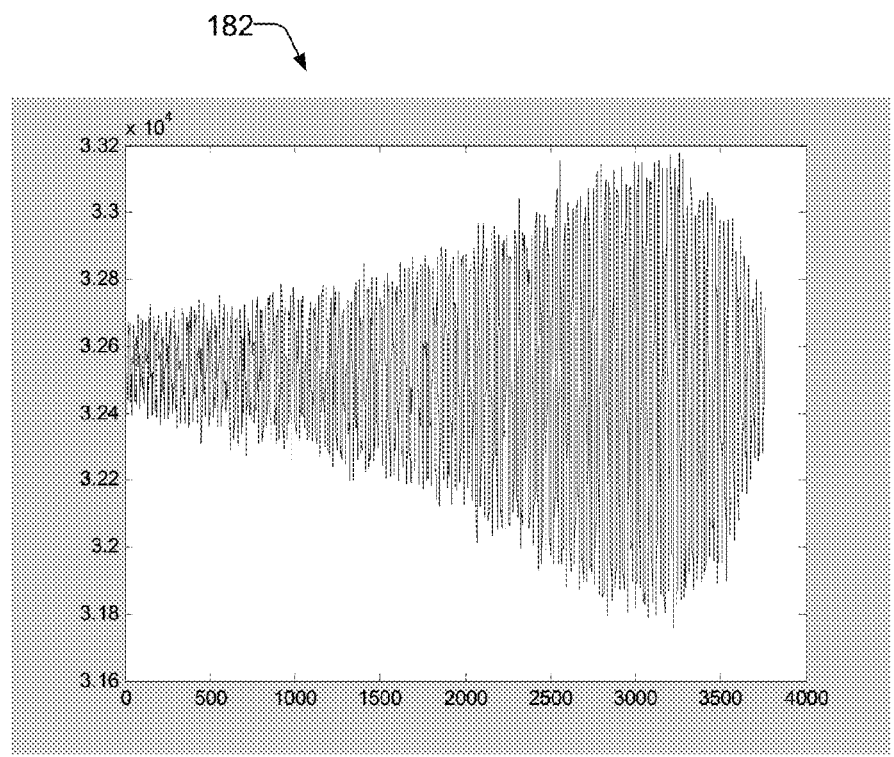
FIG. 8A shows a plot of a resampled interference dataset composed of a single segment of the sample points.
Figure 8B:
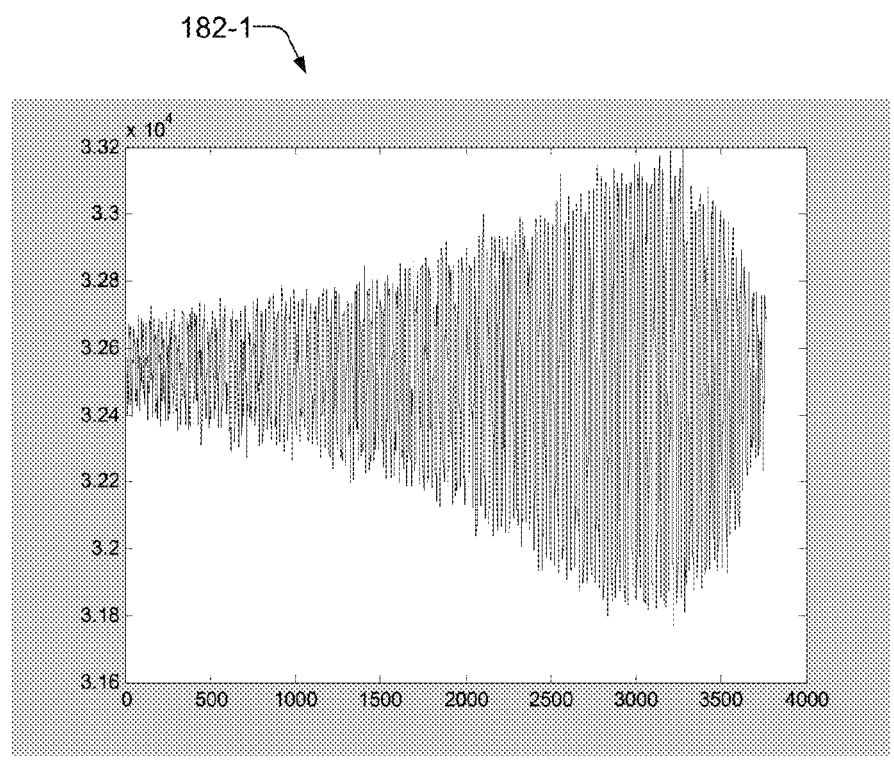
FIG. 8B shows a plot of an resampled result for the same interference set divided into two segments of the sample points.

FIGS. 8A and 8B show resampled data for segments of the resampled points 182 for the same interference dataset 142. FIG. 8A shows the resampled data for one selected segment of the resampled points 182. FIG. 8B shows the resampled data for two selected segments of the resampled points 182-1. The resampled data for two segments of the resampled points 182-1 in FIG. 8B have been stitched/combined to show that the resampled data are virtually identical between the two figures. This illustrates that resampling of interference datasets 142 in two or more segments 182 has no material effect on the resampling data as compared to current systems and methods.

Figure 9:
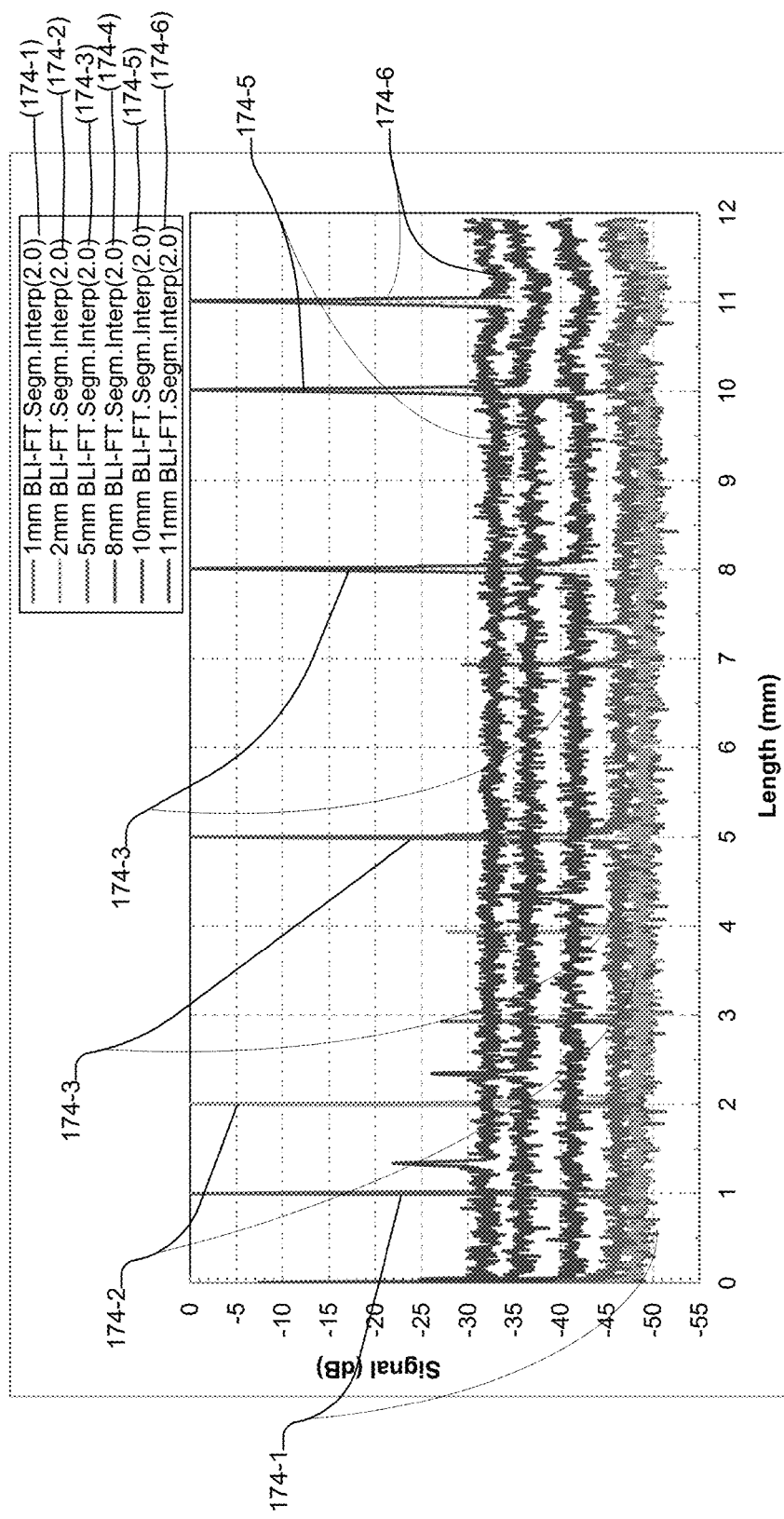
FIG. 9 shows linearized interference datasets of a sample, when the signals of the interference dataset have been resampled at different effective coherence lengths.

FIG. 9 displays linearized interference datasets 174-1 through 174-6 associated with imaging depths of 1 mm, 2 mm, 5 mm, 8 mm, 10 mm, and 11 mm, respectively. As the imaging depth increases, the resampling performance as indicated by the strength of the signal decreases, requiring more resampling points 310 to reconstruct the interference dataset 142. As a result, the number of selected segments of the resampled points 182 tends to increase with increasing imaging depth.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing interference signals in an optical coherence tomography system, comprising:
    generating k-clock signals in response to frequency sweeping of a swept optical signal;
    generating interference signals from the swept optical signal;
    sampling the k-clock signals and the interference signals to generate a k-clock dataset and an interference dataset;
    creating a clock phase function from the k-clock dataset;
    dividing the interference dataset into segments of sample points;
    resampling the segments of the sample points using the clock phase function; and
    combining the segments of resampled points into a linearized interference dataset.

2. The method of claim 1, further comprising resampling the segments of the sample points using a Field Programmable Gate Array.

3. The method of claim 1, further comprising creating the clock phase function by performing a Hilbert Transform upon the k-clock dataset.

4. The method of claim 1, further comprising dividing the k-clock data set into phase segments, and creating the clock phase function by:
    performing a Hilbert Transform upon the phase segments; and
    combining the transformed phase segments.

5. The method of claim 1, further comprising performing a Fourier transform upon the linearized interference dataset to obtain axial profiles of the sample.

6. The method of claim 1, wherein the combining of the segments of resampled points comprises aligning adjacent segments of the resampled points in time.

7. The method of claim 1, further comprising selecting resampling regions of the interference dataset for resampling the segments of the sample points.

8. The method of claim 7, further comprising selecting an overlap region between adjacent resampling regions, wherein the overlap region includes one or more resampled points in common between the adjacent resampling regions.

9. The method of claim 8, further comprising aligning the adjacent segments of the resampled points according to the overlap regions for combining the segments of the resampled points into the linearized interference dataset.

10. The method of claim 1, further comprising performing the resampling of the segments of the sample points by:
    upsampling the segments of the sample points to create transformed segments;
    performing linear interpolation of the transformed segments to create the segments of the resampled points; and
    performing an Inverse Fourier Transform upon the segments of the resampled points.

11. The method of claim 10, further comprising upsampling the segments of the sample points by performing a band-limited Fourier Transform upon the segments of the sampling points.

12. The method of claim 10, further comprising performing the linear interpolation of the transformed segments by zero-padding the transformed segments.

13. The method of claim 1, further comprising performing a Fourier transform upon the linearized interference dataset to obtain a point spread function (PSF) of the sample.

14. The method of claim 1, further comprising performing the resampling of the segments of the sample points by:
    selecting a resampling region of the interference dataset for each segment of the sample points, wherein each resampling region includes the sample points for each segment, and wherein each resampling region includes additional sample points within an overlap region of the interference dataset;
    upsampling the resampling regions to create transformed resampling regions;
    performing linear interpolation of the transformed resampling regions; and
    performing an Inverse Fourier Transform upon the transformed resampling regions to create linearized resampling regions.

15. The method of claim 14, further comprising upsampling the resampling regions by performing a band-limited Fourier Transform upon the resampling regions to create the transformed resampling regions.

16. The method of claim 14, further comprising performing the linear interpolation of the transformed resampling regions by zero-padding the transformed resampling regions.

17. The method of claim 14, wherein combining the segments of resampled points into the linearized interference dataset is accomplished by aligning their linearized resampling regions according to the sample points in the overlap regions.

18. A system for processing interference signals in an optical coherence tomography system, comprising:
    a k-clock module that generates k-clock signals in response to frequency sweeping of a swept optical signal;

an interferometer that generates interference signals from the swept optical signal;

a data acquisition system that samples the k-clock signals and the interference signals to generate a k-clock dataset and an interference dataset; and a rendering system that:
 creates a clock phase function from the k-clock dataset;
 divides the interference dataset into segments of sample points;
 resamples the segments of the sample points using the clock phase function;
 and combines the segments of resampled points into a linearized interference dataset.

19. The system of claim 18, wherein the rendering system divides the interference dataset into the segments of the sample points in response to imaging depth of the interference signals upon the sample.

20. The system of claim 18, wherein the rendering system includes computer memory utilized during the resampling of the segments of the sample points, and wherein the rendering system divides the interference dataset into the segments of the sample points in response to depth of the computer memory.

21. A system for processing interference signals in an optical coherence tomography system, comprising:
 a k-clock module that generates k-clock signals in response to frequency sweeping of a swept optical signal;
 an interferorneter that generates interference signals from the swept optical signal;
 a data acquisition system that samples the k-clock signals and the interference signals to generate a k-clock dataset and an interference dataset; and
 a data processing system that:
  creates a clock phase function from the k-clock dataset;
  divides the interference dataset into segments of sample points;
  resamples the segments of the sample points using the clock phase function; and
  combines the segments of resampled points into a linearized interference dataset.

22. A method for processing interference signals in an optical coherence tomography system, comprising:
 generating k-clock signals in response to frequency sweeping of a swept optical signal;
 generating interference signals from the swept optical signal;
 sampling the k-clock signals and the interference signals to generate a k-clock dataset and an interference dataset;
 creating a clock phase function from the k-clock dataset by performing a Hilbert Transform upon the k-clock dataset;
 dividing the interference dataset into segments of sample points;
 resampling the segments of the sample points using the clock phase function in a Field Programmable Gate Array by upsampling the segments of the sample points to create transformed segments, performing linear interpolation of the transformed segments to create the segments of the resampled points, and performing an Inverse Fourier Transform upon the segments of the resampled points; and
 combining the segments of resampled points into a linearized interference dataset.

* * * * *

UNITED STATES PATENT AND TRADEMARK OFFICE
CERTIFICATE OF CORRECTION

PATENT NO. : 9,869,542 B2
APPLICATION NO. : 14/257568
DATED : January 16, 2018
INVENTOR(S) : Brian Goldberg et al.

It is certified that error appears in the above-identified patent and that said Letters Patent is hereby corrected as shown below:

In the Claims

Claim 21, Column 17, Line 29, delete "interferorneter" and insert --interferometer--.

Signed and Sealed this
Tenth Day of April, 2018

Andrei Iancu
*Director of the United States Patent and Trademark Office*